United States Patent [19]

Mathews

[11] Patent Number: 4,527,683
[45] Date of Patent: Jul. 9, 1985

[54] TORQUE LIMITING COIL CLUTCH AND AUTOMATIC SLACK ADJUSTER UTILIZING SAME

[75] Inventor: George P. Mathews, Portage, Mich.

[73] Assignee: Eaton Corporation, Cleveland, Ohio

[21] Appl. No.: 477,716

[22] Filed: Mar. 22, 1983

[51] Int. Cl.³ .................................... F16D 11/00
[52] U.S. Cl. ......................... 192/111 A; 192/56 C;
              192/41 S; 188/71.9; 464/40
[58] Field of Search .................. 188/79.5 R, 79.5 GE,
   188/196 F, 196 P, 71.8, 71.9, 196 D, 79.5 K, 77
   W, 196 BA; 192/41 S, 81 C, 7 S, 111 A, 56 C;
                                                    464/40

[56]                References Cited
           U.S. PATENT DOCUMENTS

| | | | |
|---|---|---|---|
| 677,872 | 7/1901 | Locke | 464/40 X |
| 1,909,420 | 5/1933 | Palmgren | 192/72 |
| 2,242,379 | 5/1941 | Wahl | 464/40 |
| 2,360,187 | 10/1944 | Almen | 464/40 |
| 2,484,185 | 10/1949 | Pepper | 192/41 S |
| 2,533,973 | 12/1950 | Starkey | 464/40 |
| 2,595,454 | 6/1952 | Greenlee | 464/40 |
| 2,705,065 | 3/1955 | Kloss | 192/81 C |
| 2,793,515 | 5/1957 | Hunstiger et al. | 464/40 |
| 2,895,578 | 7/1959 | Winchell | 192/41 S |
| 3,395,553 | 8/1968 | Stout | 464/40 |
| 3,405,929 | 10/1968 | Kaplan | 267/1 |
| 3,450,365 | 6/1969 | Kaplan | 242/67.4 |
| 3,507,369 | 4/1970 | Oliver | 188/196 |
| 3,528,533 | 9/1970 | Sacchini | 192/41 S |
| 3,727,732 | 4/1973 | Barr | 192/26 |
| 3,893,554 | 7/1975 | Wason | 464/40 X |
| 3,901,357 | 8/1975 | Reitz et al. | 188/79.5 |
| 3,997,035 | 12/1976 | Zeidler | 188/79.5 K |
| 4,235,312 | 11/1980 | Garrett et al. | 188/72.7 |
| 4,243,129 | 1/1981 | Schoeps | 464/40 X |
| 4,249,644 | 2/1981 | Urban | 188/196 D |
| 4,280,606 | 7/1981 | Taylor | 192/56 C |
| 4,351,419 | 9/1982 | Garrett et al. | 188/71.9 |
| 4,394,890 | 7/1983 | Kleinhagen, Jr. | 188/71.9 |

FOREIGN PATENT DOCUMENTS

| | | | |
|---|---|---|---|
| 478084 | 10/1951 | Canada | 192/41 S |
| 623996 | 7/1961 | Canada | 192/41 S |
| 2283357 | 3/1976 | France . | |
| 243655 | 7/1946 | Switzerland . | |

Primary Examiner—Allan D. Herrmann
Assistant Examiner—Shirish Desai
Attorney, Agent, or Firm—C. H. Grace; H. D. Gordon

[57]                ABSTRACT

An improved two-way torque limiting coupling (10) of the type utilizing a single helical coil clutch (18) and an automatic slack adjuster utilizing same is provided. The coupling provides a driving connection between a first (12) and a second (14) rotatable adjacent members. The first member includes a bore (24) opening to an end (20) in which one end of coil clutch is received in interference fit to define an internal clutch interface (34) and the other member defines an annular outer periphery (26) about which the other end of the coil clutch is received in an interference fit to define an external clutch interface (36). For the direction of rotation tending to expand the coil clutch (18), the coupling will slip at the external interface (36) which is the low maximum torque transfer direction of rotation for that interface and for the direction of rotation tending to contract the coil clutch (18), the coupling will slip at the internal interface (34) which is the low maximum torque transfer direction of rotation for that interface.

6 Claims, 7 Drawing Figures

TORQUE LIMITING COIL CLUTCH AND AUTOMATIC SLACK ADJUSTER UTILIZING SAME

BACKGROUND OF THE INVENTION

1. Field of the Invention

The present invention relates to an improved torque limiting coil clutch and in particular to a torque limiting coil clutch connection which will limit torque transmission in each direction of rotation by slipping at a clutch surface or interface at which torque is transmitted in the low torque transfer capacity direction of rotation for that interface and to automatic clearance sensing slack adjusters utilizing same.

2. Description of the Prior Art

Torque limiting coil clutches utilized to provide a limited torque rotational connection between a rotary driving and driven member are well known in the prior art as may be seen by reference to U.S. Pat. Nos. 3,727,732 and 4,280,606, the disclosures of which are hereby incorporated by reference. Briefly, in devices of this type the coil clutch is selected to slip at torque valves above a predetermined maximum.

Automatic slack adjusters of the single acting clearance or force sensing type, usually utilized to adjust vehicle brakes to compensate for friction lining wear, are well known in the prior art as may be seen by reference to U.S. Pat. Nos. 3,507,369; 3,901,357; 3,997,035 and 4,235,312, the disclosures of which are hereby incorporated by reference. These devices typically utilize a so called "one-way" helical coil clutch to limit torque applied to the brake adjustment member in the clearance or slack takeup, i.e. slack decreasing, direction of rotation. While such clutches are often referred to as one-way clutches as they are effective to rotate the driven member in only one direction against the system resistance to rotation, they are actually two-way devices having a relatively higher and a relatively lower maximum torque transfer capacity direction of rotation. In single acting adjusters of this type, it is important that a separate true one-way connection be provided, or that the torque transfer capacity of the coil clutch in the backoff direction of rotation be relatively small i.e. (smaller than system resistance to rotation of the adjuster member in the backoff or slack increasing direction of rotation) to prevent unwanted backoff of the slack adjuster.

Automatic clearance sensing slack adjusters wherein the torque limiting coil clutch will slip in the low torque transfer direction of rotation while rotating the adjustment member in the slack decreasing direction of rotation are known as may be seen by reference to U.S. Pat. No. 4,351,419, the disclosure of which is hereby incorporated by reference. By slipping in the low torque transfer capacity direction of rotation, the clutch slip torque is less sensitive to variations in coefficient of friction between the coil clutch and the surfaces of the driving and driven members engaged thereby. It is noted that relatively large variations in the coefficient of friction between the coil clutch and the surfaces engaged thereby may occur upon wear, loss of lubrication and the like.

While the prior art torque limiting coil clutches, and the clearance sensing single acting automatic slack adjusters utilizing same, are relatively acceptable, the devices are not totally satisfactory as the clutches do not slip in the low torque transfer capacity direction of rotation for the interface surface in both directions of rotation and thus automatic slack adjusters utilizing same may be sensitive to variations of or changes in coefficient of friction in the high torque transfer direction of rotation and/or require an additional one-way coupling, such as an additional coil clutch, ratchet, sprague clutch or the like.

SUMMARY OF THE INVENTION

In accordance with the present invention, the drawbacks of the prior art have been overcome to the extent that a torque limiting coil clutch connection between two relatively rotatable members is provided which will slip in the relatively low maximum torque transmitting capacity direction of rotation for the interface surfaces thereof for both directions of rotation. Accordingly, the torque transfer capacity of the coupling or connection in both directions of rotation is relatively insensitive to large variations in the coefficient of friction between the coil clutch and the surfaces of coupled members engaged thereby. In an automatic single acting clearance sensing slack adjuster utilizing the coil clutch coupling of the present invention, a single coil clutch may be utilized to provide the torque limiting function in the slack take up direction of rotation and the so called one-way function in the slack increasing direction of rotation of the brake adjustment member, both of which functions are relatively stable and insensitive to coefficient of friction induced variations. The need for a separate one-way coupling and an intermediate member is eliminated.

The above is accomplished by providing a single coil clutch for coupling two generally coaxial relatively rotatable members. The coil clutch surrounds the outer periphery of one of the members in an interference fit to define an exterior clutch connection therewith and is received in the bore of the second member in an interferance fit to define an interior clutch connection therewith. In the direction of rotation tending to wind the clutch down, i.e. causing the coil clutch to contract, the low torque transfer surface will be at the interior clutch connection while rotation in the other direction will tend to cause the coil clutch to wind out, i.e. expand, and the low torque transfer surface will be at the exterior clutch connection. While being careful to maintain the maximum torque transfer capacity of the high torque transfer capacity surfaces in each direction of rotation at at least as great as the maximum torque transfer capacity of the low torque transfer capacity in that direction, by varying the interferance fit, the number of coils and/or moment of inertia of the coils, the maximum torque limit or slip value in either direction of rotation may be varied as required. Accordingly, the torque transmitting capacity, i.e. the slip torque, of the clutch connection may be set at a desired value in one direction of rotation, at a different desired value in the other direction of rotation, and in both directions of rotation the slip torque will be relatively insensitive to large variations in surface finish, lubrication and other factors which may effect the coefficient of friction between the clutch coils and the surface engaged thereby.

Accordingly, it is an object of the present invention to provide a new and improved torque limiting coil clutch connection and a new and improved single acting, clearance sensing automatic slack adjuster utilizing same.

This and other objects and advantages of the present invention will become apparent from a reading of the detailed description of the invention, taken in connection with the drawings.

DESCRIPTION OF THE PREFERRED EMBODIMENT

Figure 1:
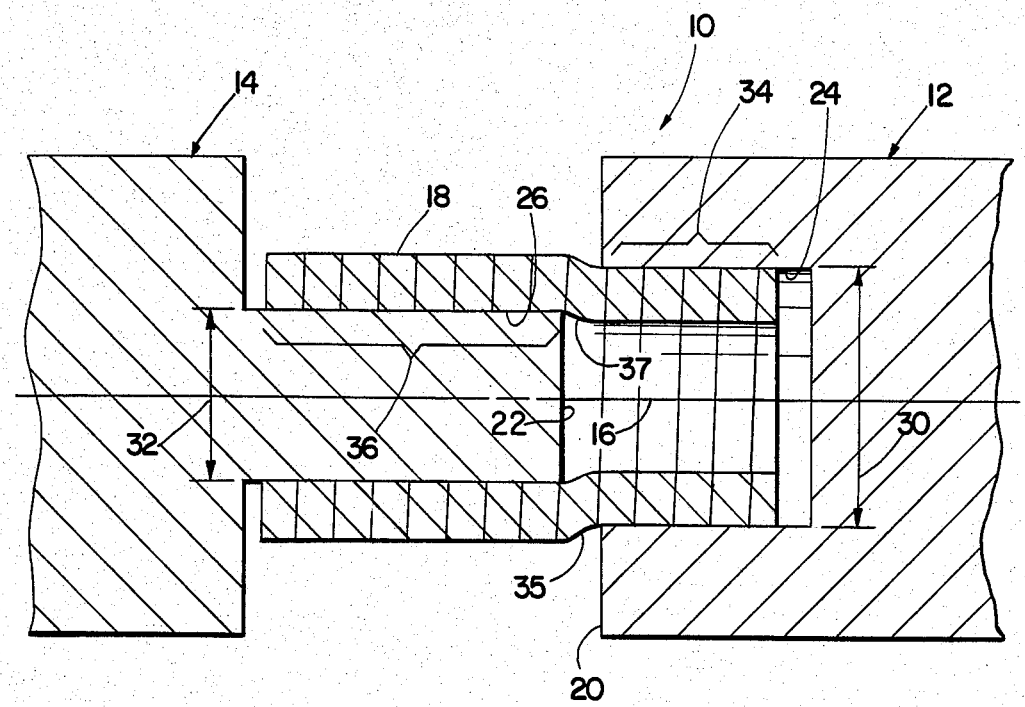
FIG. 1 is a side view, partially in section, of the coil clutch coupling of the present invention.

Certain terminology will be used in the following description for convenience in reference only and will not be limiting. The words "upwardly," "downwardly," "rightwardly" and "leftwardly" will designate directions in the drawings to which reference is made. The words "clockwise" and "counterclockwise" will designate direction of rotations as viewed from the right of the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Figure 2:
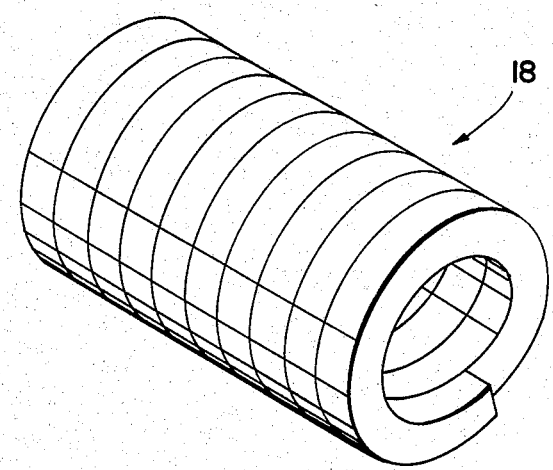
FIG. 2 is a prespective view of the helical coil clutch of FIG. 1.

One embodiment of the torque limiting helical coil clutch connection 10 of the present invention may be seen by reference to FIGS. 1 and 2. The driving connection 10 includes a first rotatable member 12, a second rotatable member 14 both rotatable about a common axis of rotation 16 and drivingly connected by a helical coil clutch 18. Coil clutch 18 is of a righthand winding and will thus tend to radially expand when transmitting a clockwise rotation between members 12 and 14 and will tend to radially contract when transmitting a counterclockwise rotation between members 12 and 14.

Member 12, at its lefthand end 20 which is adjacent the righthand end 22 of member 14, is provided with an internal bore 24 opening to lefthand end 20 and the righthand end 22 of member 14 is provided with an axially extending annular surface 26. Helical coil clutch spring 18 is received within the inner bore 24 of member 12 and surrounds the periphery of annular surface 26 of member 14. Bore 24 is of a diameter 30 slightly less than the nondeformed outer diameter of coil clutch 18 whereby the righthand end of coil clutch 18 is received within bore 24 with an interference fit. The outer periphery 26 is of a diameter 32 which is slightly greater than the nondeformed inner diameter of coil clutch 18 whereby coil clutch 18 is received on the outer periphery 26 of member 14 in an interference fit.

As may be seen, torque limiting helical coil clutch connection 10 comprises an interior clutch surface interface 34 defined by the interior surface of bore 24 and exterior surface 35 of clutch 18 and an exterior clutch interface surface 36 defined by the exterior periphery of annular surface 26 and the interior surface 37 of helical coil clutch 18.

At each coil clutch torque transmitting interface, 34 and 36, the maximum torque, i.e. the slip torque, which may be transmitted to the clutch by the driving member or from the clutch to the driven member has a high torque transmitting value ($T_H$) in the high torque transmitting direction of rotation for that interface and a low torque transmitting value ($T_L$) in the low torque transmitting direction of rotation for that interface. For an interface defined by a coil clutch surrounding an annular surface, i.e. an exterior interface such as 36, the direction of rotation tending to decrease the diameter of the clutch i.e. counterclockwise rotation, is the high torque transmitting direction of rotation for that interface while the direction of rotation tending to increase the diameter of the clutch, i.e. clockwise rotation, is the low torque transmitting direction of rotation at that interface. For an interface defined by a coil clutch received in an annular bore, such as interior interface 34, the direction of rotation tending to decrease the diameter of the clutch is the low torque transmitting direction of rotation at that interface while the direction of rotation tending to increase the diameter of the clutch is the high torque transmitting direction of rotation at that interface.

As is known for coil clutch connections, at each interface, 34 and 36, the theoretical maximum torque that may be transmitted across the interface in the high torque transmitting direction of rotation for that interface ($T_H$) and the theoretical maximum torque that may be transmitted across the interface in the low torque transmitting direction of rotation for that interface ($T_L$) may be approximated by the following relationships:

$$T_H = M(e^{2\pi\mu N} - 1) \text{ inch pounds}$$

$$T_L = M(e^{-2\pi\mu N} - 1) \text{ inch pounds}$$

where:
  $M = 21E\Delta/D^2$
  $I$ = wire moment of inertia
    round = $\pi d^4/64$
    rectangular = $bh^3/12$
  $E$ = Youngs modulus $30 \times 10^6$
  $\Delta$ = Diametrical interference
  $D$ = Diameter of shaft or bore
  $\mu$ = Coefficient of friction
  $N$ = number of clutch coils at interface By way of example, for an exterior interface with a rectangular cross section wire coil clutch having a base (b) of 0.200 inch a height (h) of 0.285 inch, a shaft of 1.8745 diameter, a spring inner diameter of 1.829 inch ($\Delta = 0.0455$ inch), 4 coils in contact, and a coefficient of friction of 0.1, than:
  $I = 385.8 \times 10^{-6}$
  $\Delta = 0.0455$ inch
  $D = 1.8745$ inch
  $\mu = 0.1$
  $N = 4$
  $2\pi\mu N = 2.5132$
  $(e^{2\pi\mu N} - 1) = 11.345$
  $(e^{-2\pi\mu N} - 1) = -0.01899$
and:
  $T_H = 299.7 \times 11.345 = 3398$ inch pounds
  $T_L = 299.7 \times (-91899) = -275$ inch pounds
where the negative value of $T_L$ reflects the fact that $T_H$ and $T_L$ are in opposite directions of rotation.

Accordingly, by reasonably careful design, the $T_H$ of interface 34 will always exceed the $T_L$ of interface 36 and the $T_H$ of interface 36 will always exceed the $T_L$ of interface 34. This means that in the clockwise direction of rotation, the torque limited coil connection 10 will always slip first at interface 36 which is the low torque transfer interface of connection 10 in the clockwise direction of rotation. For counterclockwise rotation, the connection 10 will always slip first at interface 34, which is the low torque transfer direction of rotation for interface 34.

Figure 7:
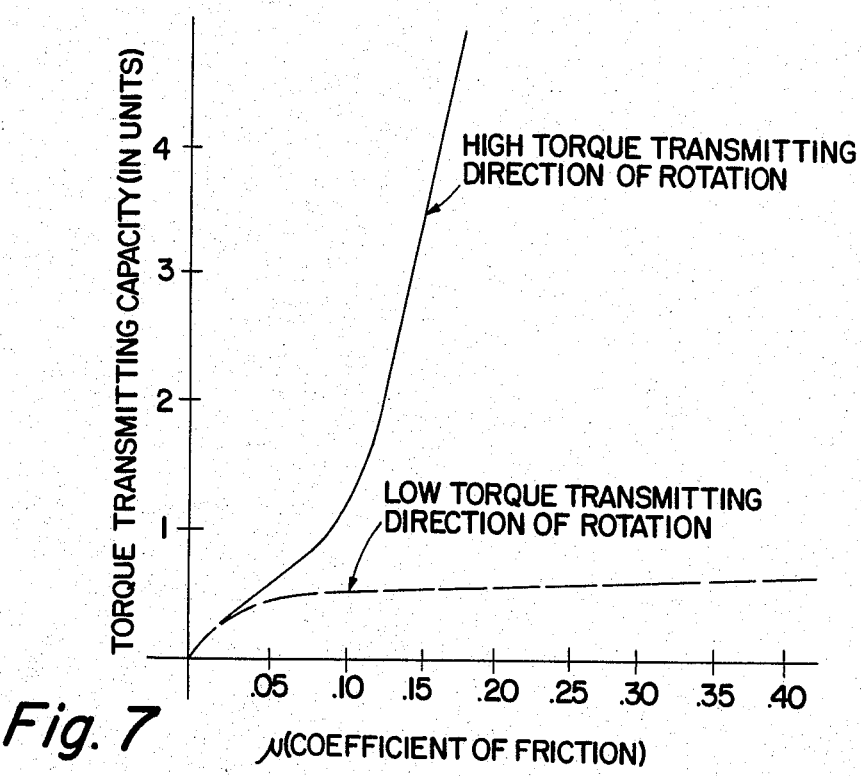
FIG. 7 is a graphical representation of the torque transmitting characteristics of a typical coil clutch interface.

The advantages of limiting torque transfer across a coil clutch coupling by slipping in the low torque transfer direction of rotation of the coupling, or of an interface thereof, may be seen by reference to FIG. 7. As may be seen, the maximum torque transmitting capacity of a coil clutch is extremely sensitive to the coefficient of friction in the high torque transfer capacity direction of rotation and is relatively insensitive to coefficient of friction in the low torque transfer direction of rotation.

To illustrate this advantage, assume the example considered above is modified only in that the coefficient of friction is increased from 0.1 to 0.3, then:

$2\pi\mu N = 5.0264$
$(e^{2\pi\mu N} - 1) = 151.5$
$(e^{-2\pi\mu N} - 1) = -0.9934$
$T_H = 299.7 \times 151.5 = 45,404.55$ inch pounds
$T_L = 299 \times (-9934) = -297.72$ inch pounds It may thus be seen that while $T_H$ is highly sensitive to changes in the coefficient of friction, $T_L$ is relatively insensitive to changes in the coefficient of friction.

This feature is especially important in devices wherein the slip torque must be relatively accurately controlled and surface finishes and/or lubrication may be difficult to control.

It may be seen that torque limiting coil clutch connection 10, by providing both an interior interface and an exterior interface, provides a torque limiting coupling which will limit torque transfer between two rotatable members, 12 and 14, and that such torque limiting in both directions of rotation will result due to a slippage at the low torque transfer interface for that direction of rotation in the low torque transfer direction of rotation for that interface. The slip torque at that interface for that direction of rotation being relatively insensitive to variations in the coefficient of friction between the surface engaged by the coil clutch and the coil clutch.

By careful attention to design details, such as carefully selecting the diameter 32 of the outer periphery 26 or the diameter 30 of the bore 24, selecting the number of coils to be engaged at a particular interface and/or carefully selecting the diametrical interference between the coil clutch 18 and the surface engaged thereby, the slip torque in both the clockwise and counterclockwise direction may, within design limits, be selected and may differ from one another.

Figure 3:
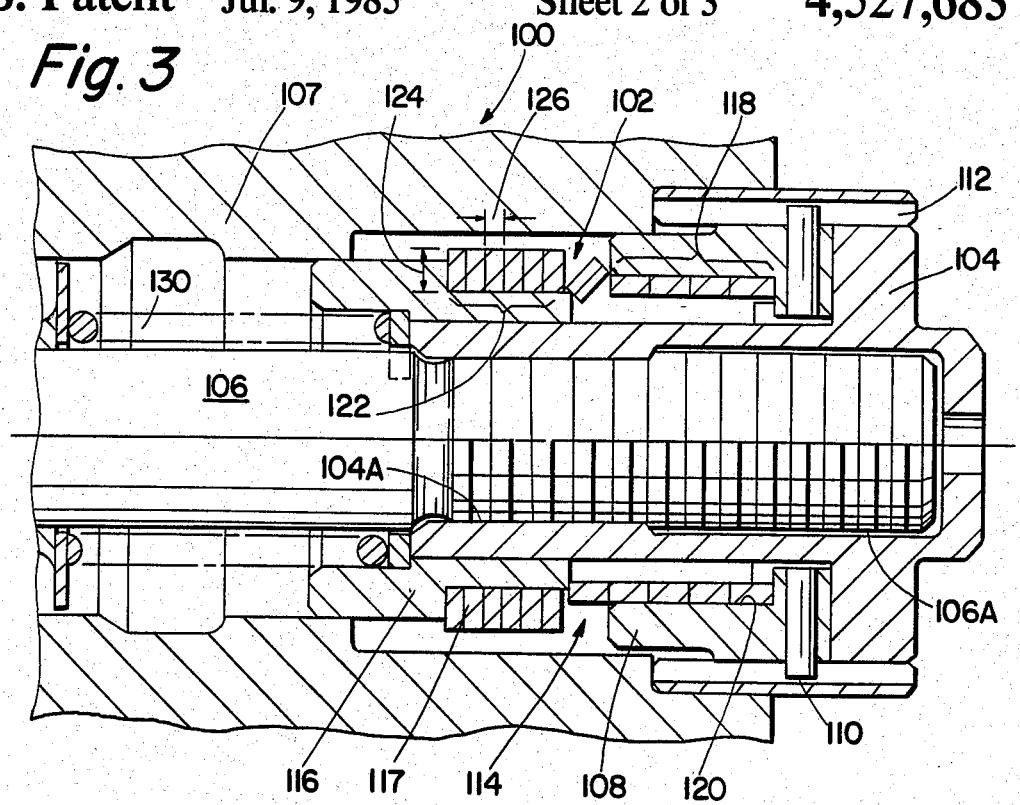
FIG. 3 is a partial side view, partially in section, of an automatic slack adjuster utilizing an alternate embodiment of the present invention.

A portion of an automatic single acting clearance sensing slack adjuster 100 as utilized with a disc brake wedge-type actuator is illustrated in FIG. 3. Although the automatic slack adjuster is illustrated as utilized with a wedge-type disc brake, it is understood that the adjuster is suitable for other types of clearance sensing slack adjusting purposes. Automatic slack adjusters of this type are well known in the prior art and may be seen in greater detail by reference to above-mentioned U.S. Pat. No. 4,351,419. Automatic slack adjuster 100 utilizes an alternate embodiment 102 of the coil clutch connection of the present invention. Briefly, the automatic slack adjuster includes a nut member 104 which is urged leftwardly by an unseen wedge actuator to force a rod 106 leftwardly to engage the disc brake. Actuators of this type are illustrated in U.S. Pat. Nos. 3,547,229; 4,064,973 and 4,085,830, the disclosures of which are all hereby incorporated by reference.

Nut 104 is provided with internal threads 104A which mate with external threads 106A provided on the rod member 106. Accordingly, leftward axial movement of nut member 104 will result in a corresponding axial movement of rod member 106. A driving sleeve 108 abuts nut member 104 for axial movement therewith. Driving sleeve 108 carries a pin member 110 fixed thereto which is received in a helical groove 112 provided in the adjuster housing 107. As is known, the pin members 110 may be received with a predetermined amount of clearance in groove 112 to provide for a predetermined amount of running clearance between the brake friction surfaces and, after takeup of the lost motion between the pins 110 and groove 112, will cause the driving member 108 to be rotated. A helical coil spring 114 drivingly connects drive sleeve 108 with a driven member 116 which is attached to the nut member 104 as at a splined connection 117 for rotation therewith. Of course, all or a portion of the required lost motion may be provided at connection 117.

Briefly, rotation of driven member 116 and nut member 104 will advance the rod member 106, which is axially movable in but rotationally fixed to the housing, relative to the nut member. Rotation of nut member 104 in the slack decreasing or slack takeup direction of rotation will result in the rod member being advanced leftwardly as seen in FIG. 3. A compressed return spring 130 urges the rod member 106 and nut member 104 rightwardly.

Helical coil clutch connection 102 comprises the helical coil clutch 114 and interior clutch interface 118 with an interior bore 120 formed in driving sleeve 108 and an exterior clutch interface 122 formed at the outer periphery of driven member 116.

Helical coil clutch 114 is wound to radially expand in the direction of rotation of driven member 116 which will decrease slack in the brake and to radially contract in the other direction of rotation. Accordingly, the coil clutch connection 102 will slip at interface 122 in the slack takeup direction of rotation and will slip at interface 118 in the other direction of rotation. As is known in single acting slack adjusters of this type, it is important that the torque transferred from the driving member 108 to the driven member 116 in the direction of rotation opposite the slack takeup direction of rotation be less than that required to rotate the adjustment member against the system frictional resistance to such rotation to prevent backoff of the brake. In a typical slack adjuster of this type, the coupling 102 should slip at about 200–260 inch pounds in the slack takeup direction of rotation and the coupling 102 should slip at about 18–30 inch pounds in the other direction of rotation. Accordingly, the low torque transfer capacity of interface 122 in the slack takeup direction of rotation should equal 200–260 inch pounds while the low torque transfer capacity of interface 118 should equal about 18–30 inch pounds in the other direction of rotation.

It has been found that it is often difficult to achieve such a magnitude of difference in the low torque transfer capacities of the exterior and interior interfaces utilizing a clutch structure of the type illustrated in FIG. 1. To achieve such a magnitude of differences in low torque transfer capacities of the interfaces, a single coil clutch 114 is utilized having a generally rectangular cross-section wherein one dimension 124 is considerably greater than its other dimension 126. By utilizing the larger dimension 124 as the height (h) of the coil clutch cross-section at the interface 122 and utilizing the smaller dimension 126 as the height (h) of the rectangular cross-section at the interface 118 it has been possible to achieve the magnitude of differences in the low torque transfer capacities of the interfaces required.

For example, assuming 124 equals 0.250 inch and 126 equals 0.125 inch, the wire moment of inertia, I, at interface 122 equals 0.0001627 inches to the fourth power while at interface 126 it equals 0.0000406 inches to the fourth power. Accordingly, by utilizing a non-square rectangular cross-sectional wire for the helical coil clutch, and by utilizing the longer dimension as the height (h) thereof at one interface and the shorter surface thereof as the height (h) thereof at the other interface, a torque limiting helical coil connection 102 may be provided having a relative large ratio of low torque transfer capacities at the exterior and interior clutch interfaces thereof.

Figure 4:
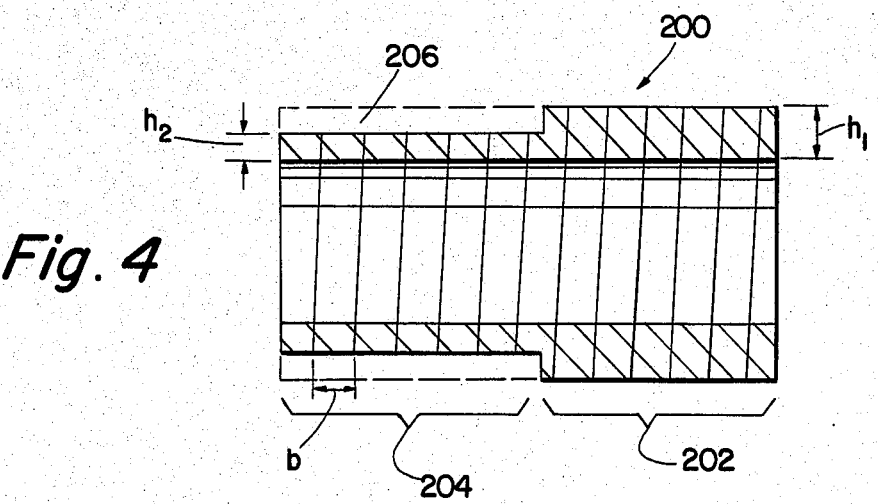
FIGS. 4-6 are side views, partially in section, of further alternate embodiments of the present invention.
Figure 5:
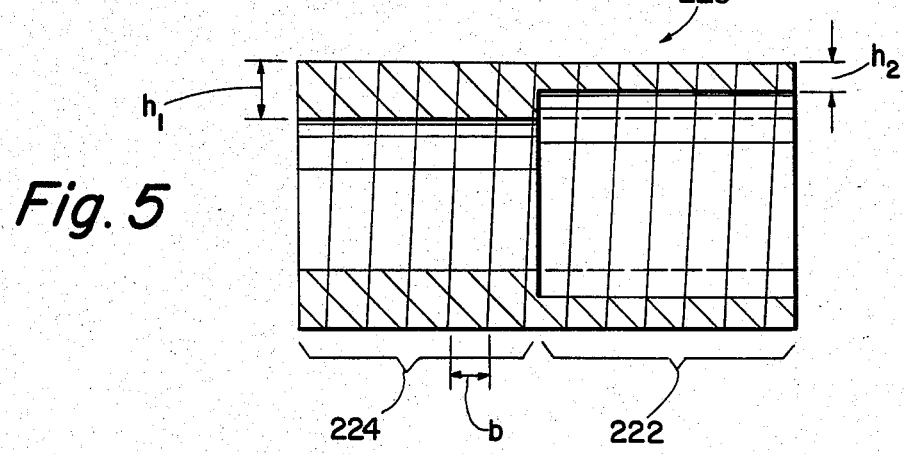
Figure 6:
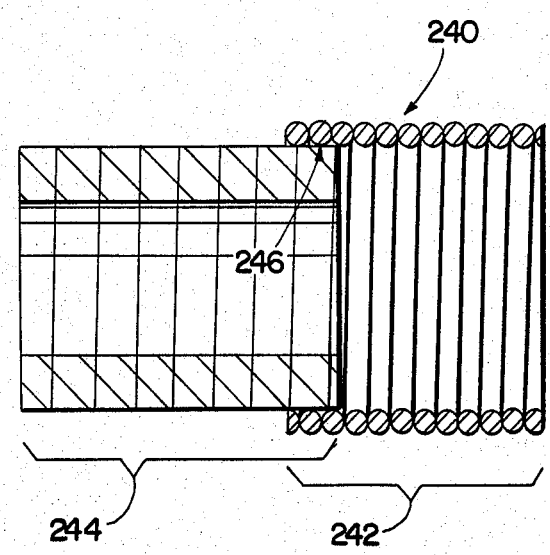

Other means of providing a helical coil clutch connection similar to coupling 10 illustrated in FIG. 1 having relatively large ratios of slip torque at the interior and exterior interfaces in the low torque transfer directions of rotation thereof may be seen by reference to FIGS. 4 through 6. In FIG. 4, helical coil clutch 200 is provided with a right-hand end 202 and a left-hand end 204 with a reduced outer diameter at the left-hand end thereof 204 which may be achieved by grinding of the portion 206 shown in dotted lines or the like. In FIG. 5, helical coil clutch 220 is provided with a right-hand end 222, a left-hand end 224 with an increased inner diameter at the right-hand end 222 thereof which may also be achieved by grinding or the like. In both coil clutch 200 and coil clutch 220, $h_1$ is greater than $h_2$. In FIG. 6, a compound helical coil clutch 240 is provided comprising a rectangular cross-section helical coil clutch left-hand portion 244 to which is attached as by welding 246 or the like, a smaller rectangular, round, square or other cross sectional shape coil clutch 242 at the right-hand end thereof.

Accordingly, it may be seen that by utilizing a helical coil clutch spring in a torque limited helical coil connection wherein the connection includes an interior clutch interface and an exterior clutch interface, a torque limiting helical coil clutch connection may be provided wherein for both directions of rotation the helical coil clutch will slip at a interface transferring torque in the low torque transfer direction of rotation thereof. Accordingly, the torque limiting operation for both directions of rotation of the coupling is relatively insensitive to variations in the coefficient of friction.

Although this invention has been described in its preferred embodiment with a certain degree of particularity, it is understood that the present disclosure of the preferred forms have been made only by way of example and that numerous changes in the details of construction and combination and arrangement of parts may be resorted to without departing from the spirit and scope of the invention as hereinafter claimed.

I claim:

1. An improved two-way torque limiting helical coil clutch connection for drivingly connecting two rotatable members, said connection comprising:
    a first rotatable member having an annular interior bore opening to one end thereof;
    a second rotatable member generally coaxial with said first member and having and end defining a generally annular periphery adjacent said one end of said first member, and
    a single helical coil clutch providing the only driving connection between said first and second members, one end of said coil clutch received in said bore in an interference fit and the other end of said coil clutch received about said outer periphery in an interference fit, said coil clutch wound in a single direction of rotation whereby said coil clutch will radially expand in one direction of rotation and will radially contract in the other direction of rotation, said coil clutch defining an interior clutch interface with the interior surface of said bore and an exterior clutch interface with said outer periphery, said interior clutch interface having a first maximum torque transfer capacity in said one direction of rotation and a second maximum torque transfer capacity in said other direction of rotation, said first maximum torque transfer capacity exceeding said second maximum torque transfer capacity, said exterior clutch interface having a third maximum torque transfer capacity in said one direction of rotation and a fourth maximum torque transfer capacity in the other direction of rotation, said fourth maximum torque transfer capacity exceeding said third maximum torque transfer capacity, the improvement characterized in that:
    said clutch connection is configured such that in the one direction of rotation said first maximum torque capacity exceeds said third maximum torque transfer capacity and in said other direction of rotation said fourth maximum torque transfer capacity exceeds said second maximum torque transfer capacity whereby for each direction of rotation said connection will limit torque transfer between said members by slipping at the interface for which that direction of rotation is the smaller maximum torque transfer capacity direction of rotation.

2. The coupling of claim 1, wherein the moment of inertia of the coil clutch at said exterior interface differs from the moment of inertia of the coil clutch at the interior interface.

3. The coupling of claim 2, wherein the nondeformed outer diameter of the coil clutch at the one end thereof is smaller than the nondeformed outer diameter of the coil clutch at the other end thereof.

4. The coupling of claim 2, wherein the nondeformed interior diameter of the coil clutch at the one end thereof is smaller than the nondeformed interior diameter of the coil clutch at the other end thereof.

5. The coupling of claim 2, wherein the cross-section of said coil clutch coils are of a non-square rectangular cross-section, defined by a larger dimension side and a smaller dimension side, said larger dimension sides of said coils contacting said bore at said interior interface and said smaller dimension sides of said coils contacting said outer periphery at said exterior interface.

6. An improved automatic single acting clearance sensing slack adjuster for a friction device of the type comprising a rotatable driving member and a generally coaxial rotatable driven member, rotation of said driven member in one direction of rotation effective to decrease slack and in the other direction to increase slack, selectively actuated actuation means for applying the friction device and means responsive to predetermined movement of the actuation means from its non-actuated position to rotate said driving member in said one direction of rotation and in response to movement of the actuation means towards its non-actuated position to rotate said driving member in the other direction of rotation, a single coil clutch drivingly connecting said driving and driven members, said coil clutch effective to slip in said one direction of rotation at a torque greater than the torque required to advance the driven members when the friction device is not engaged but less than the torque required to advance the driven member when the friction device is engaged, said coil clutch effective to slip in the other direction of rotation at a torque less than the torque required to rotate said driven member against the resistance to such rotation, and lost motion means interposed said actuating means and said friction surfaces to provide a predetermined running clearance between the friction surfaces of said friction device, the improvement comprising:

one of said driving and driven members provided with an annular bore at one end thereof, the other of said driving and driven members provided with an annular periphery at the end thereof adjacent said one end of said one of said members, said helical coil clutch having one end thereof received in said bore in an interference fit and the other end thereof received about said outer periphery in an interference fit, said coil clutch wound in a single direction of rotation whereby said coil clutch will radially expand in one direction of rotation and will radially contract in the other direction of rotation, said coil clutch defining an interior clutch interface with the interior surface of said bore and an exterior clutch interface with said outer periphery, said interior clutch interface having a first maximum torque transfer capacity in said one direction of rotation and a second maximum torque transfer capacity in said other direction of rotation, said first maximum torque transfer capacity exceeding said second maximum torque transfer capacity, said exterior clutch interface having a third maximum torque transfer capacity in said one direction of rotation and a fourth maximum torque transfer capacity in the other direction of rotation, said fourth maximum torque transfer capacity exceeding said third maximum torque transfer capacity, the improvement characterized in that:

said clutch connection is configured such that in the one direction of rotation said first maximum torque transfer capacity exceeds said third maximum torque transfer capacity and in said other direction of rotation said fourth maximum torque transfer capacity exceeds said second maximum torque transfer capacity whereby for each direction of rotation said connection will limit torque transfer between said members by slipping at the interface for which that direction of rotation is the smaller maximum torque transfer capacity direction of rotation.

* * * * *